(12) United States Patent
Kim et al.

(10) Patent No.: US 10,282,864 B1
(45) Date of Patent: May 7, 2019

(54) METHOD AND DEVICE FOR ENCODING IMAGE AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/132,475

(22) Filed: Sep. 17, 2018

(51) Int. Cl.
| | |
|---|---|
| *G06K 9/00* | (2006.01) |
| *G06T 9/00* | (2006.01) |
| *G06T 7/10* | (2017.01) |
| *G06N 3/08* | (2006.01) |

(52) U.S. Cl.
CPC .............. *G06T 9/002* (2013.01); *G06N 3/084* (2013.01); *G06T 7/10* (2017.01); *G06T 2207/20081* (2013.01); *G06T 2207/20084* (2013.01)

(58) Field of Classification Search
CPC . G06T 9/002; G06T 7/10; G06T 2207/20081; G06T 2207/20084; G06N 3/084
See application file for complete search history.

(56) References Cited

U.S. PATENT DOCUMENTS

| | | | |
|---|---|---|---|
| 10,019,788 B1* | 7/2018 | Kish | G06T 7/0002 |
| 2017/0032222 A1* | 2/2017 | Sharma | G06K 9/6256 |
| 2017/0360412 A1* | 12/2017 | Rothberg | A61B 8/085 |
| 2018/0096226 A1* | 4/2018 | Aliabadi | G06K 9/6219 |
| 2018/0144209 A1* | 5/2018 | Kim | G16H 50/20 |
| 2018/0225554 A1* | 8/2018 | Tawari | G05D 1/0088 |
| 2018/0240219 A1* | 8/2018 | Mentl | G06T 11/008 |
| 2018/0240235 A1* | 8/2018 | Mazo | G06T 7/0012 |
| 2018/0260665 A1* | 9/2018 | Zhang | G06K 9/6276 |

\* cited by examiner

*Primary Examiner* — Tom Y Lu
(74) *Attorney, Agent, or Firm* — Xsensus LLP

(57) ABSTRACT

A method for encoding an image based on convolutional neural network is provided. The method includes steps of: a learning device a learning device including a first to an n-th convolutional layers, (a) obtaining at least one input image; (b) instructing each of at least one of the convolutional layers to (i) apply one or more transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and (c) concatenating or element-wise adding the inception feature maps included in the first group to thereby generate its corresponding output feature map.

28 Claims, 6 Drawing Sheets

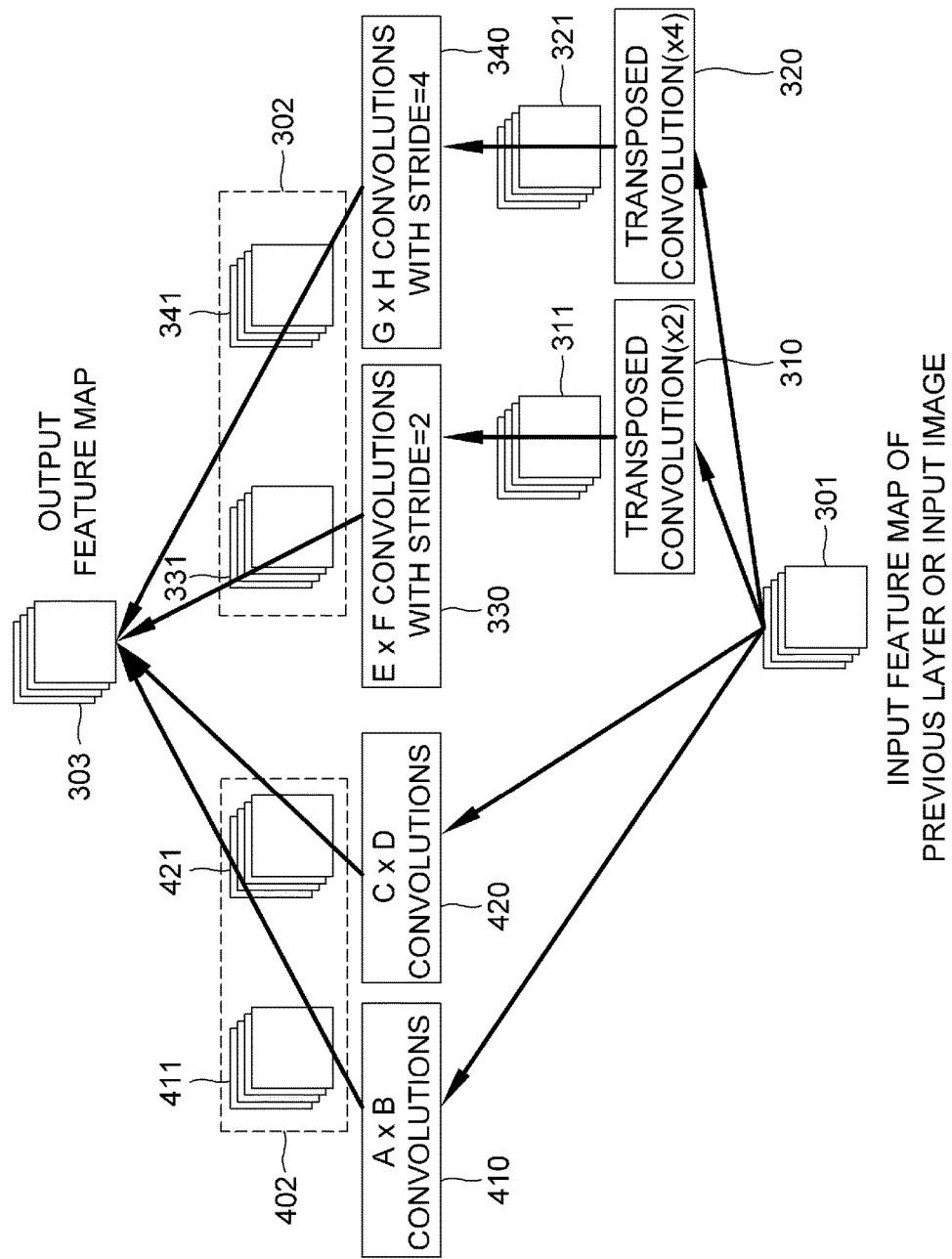

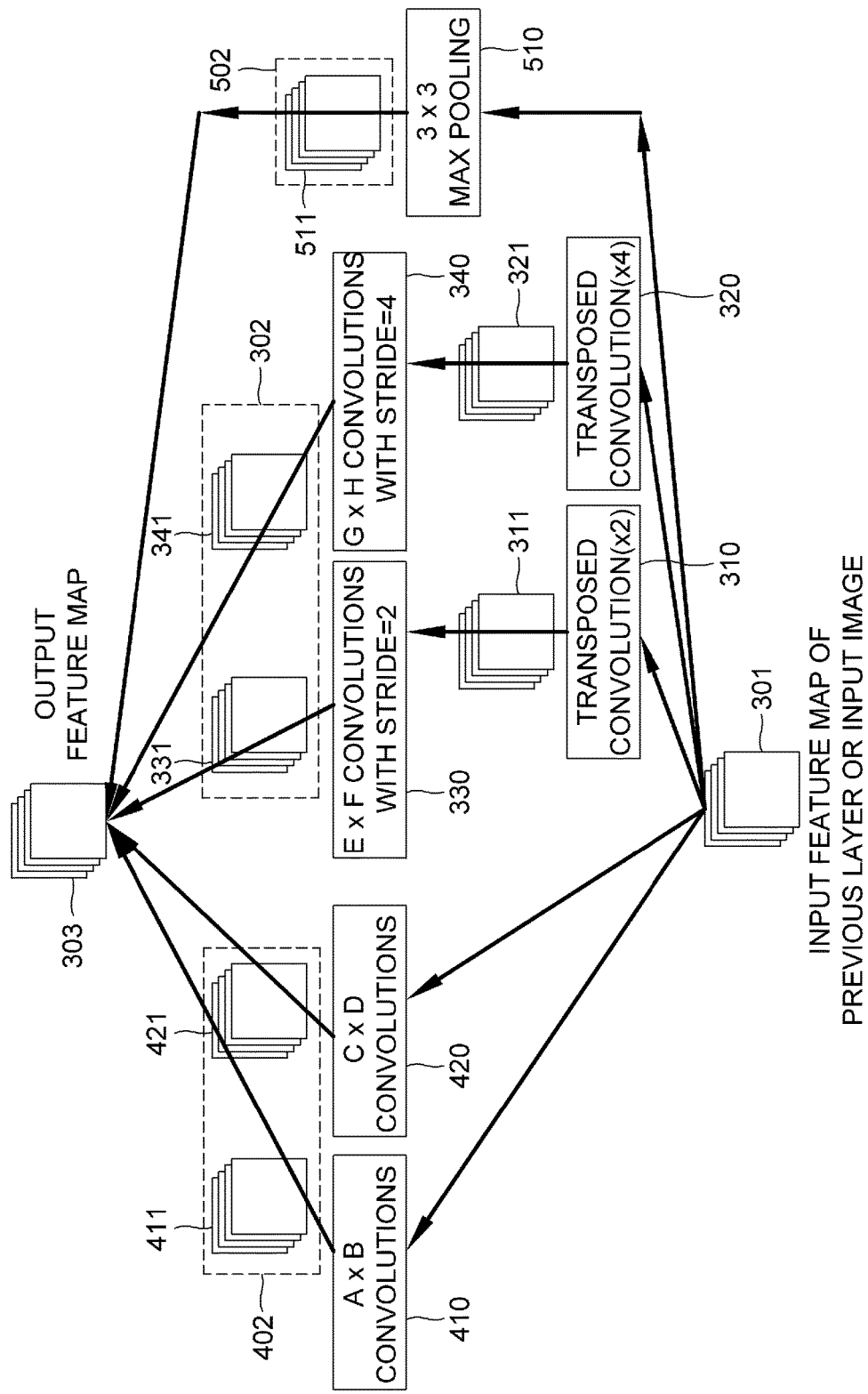

METHOD AND DEVICE FOR ENCODING IMAGE AND TESTING METHOD AND TESTING DEVICE USING THE SAME

FIELD OF THE INVENTION

The present invention relates to a method for encoding an image based on convolutional neural network (CNN), and more particularly, to the method for encoding an image based on convolutional neural network (CNN), including steps of: (a) obtaining at least one input image; (b) instructing each of at least one of a first to an n-th convolutional layers, to (i) apply one or more transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and (c) concatenating or element-wise adding the inception feature maps included in the first group to thereby generate its corresponding output feature map, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer may classify it as a dog.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a simplified drawing of a general CNN segmentation process.

Referring to FIG. 1, according to a conventional lane detection method, a learning device receives an input image, acquires encoded feature maps by multiple convolution operations and non-linear operations like ReLU in multiple convolutional layers, and acquires a segmentation result by performing multiple deconvolution operations in multiple deconvolutional layers and SoftMax operations on a last one of decoded feature maps.

FIGS. 2A and 2B illustrate various configurations of convolutional layers for encoding images by using conventional inception methods, respectively.

In the conventional inception method illustrated in FIG. 2A, convolution operations have been applied to an input feature map transmitted from the previous layer through convolution units having various kernel sizes, for example, 1×1, 3×3, and 5×5 or a combination thereof, and then various convoluted feature maps are concatenated. In this method, an intermediate feature map, i.e., an inception feature map, considering various receptive fields from one scale was obtained.

The conventional inception method shown in FIG. 2B adds a process of reducing the number of channels by using a 1×1 convolution filter in order to reduce the amount of computation.

The conventional image encoding methods using the above concept of inception can consider various receptive fields with various kernel sizes at the time of applying the convolution operations to the feature map, but there is a problem in that only the kernel sizes of 1×1 or more can be considered. Thus, it is not possible to consider various features of the image. As such, it is required to propose a new method for extracting features with more diverse characteristics considering more various kernel sizes.

SUMMARY OF THE INVENTION

It is an object of the present invention to solve all the aforementioned problems.

It is another object of the present invention to provide a new image encoding method capable of considering a kernel size smaller than 1×1 to be applied to an input feature map.

It is still another object of the present invention to provide a new image encoding method capable of obtaining more various characteristics from the input feature map compared to the conventional methods.

In accordance with one aspect of the present invention, there is provided a method for encoding an image based on convolutional neural network (CNN), including steps of: (a) a learning device, which includes a first to an n-th convolutional layers, obtaining at least one input image; (b) the learning device instructing each of at least one of the convolutional layers to (i) apply one or more transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and (c) the learning device concatenating or element-wise adding the inception feature maps included in the first group to thereby generate its corresponding output feature map.

As one example, the inception feature maps included in the first group have a same size but have different characteristics.

As one example, if at least one of the convolutional layers is a k-th convolutional layer, the step of (b) includes steps of: (b-1) the learning device instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; and (b-2) the learning device (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group.

As one example, at the step of (b), the learning device applies the convolution operations to the input image or the input feature map received from its corresponding previous convolutional layer to thereby generate one or more inception feature maps as a second group, wherein, at the step of (c), the learning device concatenates or element-wise adds the inception feature maps of the first group and the inception feature maps of the second group to thereby generate the output feature map.

As one example, if at least one of the convolutional layers is a k-th convolutional layer, the step of (b) includes steps of: (b-1) the learning device instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; (b-2) the learning device (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group; and (b-3) the learning device applying an (m+1)-th to an (m+n)-th convolution filters, which have an (m+1)-th to an (m+n)-th kernel sizes, to the input image or the (k−1)-th feature map received from the (k−1)-th convolutional layer, to thereby generate an (m+1)-th to an (m+n)-th inception feature maps as the second group.

As one example, at the step of (b), the learning device applies one or more max pooling operations, with a different size, to the input image or the input feature map received from its corresponding previous convolutional layer, to thereby generate one or more max pooling feature maps as a third group, wherein, at the step of (c), the learning device concatenates or element-wise adds the inception feature maps of the first group, the inception feature maps of the second group and the max pooling feature maps of the third group to thereby generate the output feature map.

As one example, at the step of (b), the learning device instructs the first convolutional layer to (i) apply one or more transposed convolution operations to the input image to thereby generate one or more transposed feature maps which have different sizes respectively, and (ii) apply one or more convolution operations, with a different stride and a different kernel size, to their corresponding transposed feature maps, to thereby generate one or more inception feature maps as the first group.

As one example, the method further includes a step of: (d) the learning device obtaining a CNN output based on the output feature map from the n-th convolutional layer and then performing backpropagation of a segmentation loss obtained by referring to the CNN output and its corresponding ground truth (GT).

In accordance with another aspect of the present invention, there is provided a method for encoding an image based on convolutional neural network (CNN), including steps of: (a) a testing device obtaining at least one test image, on condition that a learning device including a first to an n-th convolutional layers (i) has instructed each of at least one of the convolutional layers to apply one or more transposed convolution operations to an input image or an input feature map for training received from its corresponding previous convolutional layer, to thereby generate one or more transposed feature maps for training which have different sizes respectively; (ii) has applied one or more convolution operations, with a different stride and a different kernel size, to their corresponding transposed feature maps for training, to thereby generate their corresponding one or more inception feature maps for training as a first group for training; (iii) has concatenated or element-wise added the inception feature maps for training included in the first group for training to thereby generate its corresponding output feature map for training; and (iv) has obtained a CNN output for training based on the output feature map for training and then performs backpropagation by using a segmentation loss obtained by referring to the CNN output for training and its corresponding ground truth (GT); (b) the testing device instructing each of at least one of the convolutional layers to (i) apply the transposed convolution operations to the test image or an input feature map for testing received from its corresponding previous convolutional layer, to thereby generate one or more transposed feature maps for testing which have different sizes respectively, and (ii) apply the convolution operations, with a different stride and a different kernel size, to their corresponding transposed feature maps for testing, to thereby generate their corresponding one or more inception feature maps for testing as a first group for testing; and (c) the testing device concatenating or element-wise adding the inception feature maps for testing included in the first group for testing to thereby generate its corresponding output feature map for testing.

As one example, the inception feature maps for testing included in the first group for testing have a same size but have different characteristics.

As one example, if at least one of the convolutional layers is a k-th convolutional layer, the step of (b) includes steps of: (b-1) the testing device instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; and (b-2) the testing device (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing.

As one example, at the step of (b), the testing device further applies the convolution operations to the test image or the input feature map for testing received from its corresponding previous convolutional layer to thereby generate one or more inception feature maps for testing as a second group for testing, wherein, at the step of (c), the testing device concatenates or element-wise adds the inception feature maps for testing of the first group for testing and the inception feature maps for testing of the second group for testing, to thereby generate the output feature map for testing.

As one example, if at least one of the convolutional layers is a k-th convolutional layer, the step of (b) includes steps of: (b-1) the testing device instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; (b-2) the testing device (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing; and (b-3) the testing device applying an (m+1)-th to an (m+n)-th convolution filters, which have an (m+1)-th to an (m+n)-th kernel sizes, to the test image or the (k−1)-th feature map for testing received from the (k−1)-th convolutional layer, to thereby generate an (m+1)-th to an (m+n)-th inception feature maps for testing as the second group for testing.

As one example, at the step of (b), the testing device further applies one or more max pooling operations, with a different size, to the test image or the input feature map for testing received from its corresponding previous convolutional layer, to thereby generate one or more max pooling feature maps for testing as a third group for testing, wherein, at the step of (c), the testing device concatenates or element-wise adds the inception feature maps for testing of the first group for testing, the inception feature maps for testing of the second group for testing and the max pooling feature maps for testing of the third group for testing to thereby generate the output feature map for testing.

In accordance with still another aspect of the present invention, there is provided a learning device for encoding an image based on convolutional neural network (CNN) which includes a first to an n-th convolutional layers, including: a communication part for obtaining at least one training image as an input image; and a processor for performing processes of (I) instructing each of at least one of the convolutional layers to (i) apply one or more transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and (II) concatenating or element-wise adding the inception feature maps included in the first group to thereby generate its corresponding output feature map.

As one example, the inception feature maps included in the first group have a same size but have different characteristics.

As one example, if at least one of the convolutional layers is a k-th convolutional layer, the process of (I) includes processes of: (I-1) instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; and (I-2) (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group; and (I-3) applying an (m+1)-th to an (m+n)-th convolution filters, which have an (m+1)-th to an (m+n)-th kernel sizes, to the input image or the (k−1)-th feature map received from the (k−1)-th convolutional layer, to thereby generate an (m+1)-th to an (m+n)-th inception feature maps as the second group.

As one example, at the process of (I), the processor applies the convolution operations to the input image or the input feature map received from its corresponding previous convolutional layer to thereby generate one or more inception feature maps as a second group, and, at the process of (II), the processor concatenates or element-wise adds the inception feature maps of the first group and the inception feature maps of the second group to thereby generate the output feature map.

As one example, if at least one of the convolutional layers is a k-th convolutional layer, the process of (I) includes processes of: (I-1) instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; (I-2) (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group; and (I-3) applying an (m+1)-th to an (m+n)-th convolution filters, which have an (m+1)-th to an (m+n)-th kernel sizes, to the input image or the (k−1)-th feature map received from the (k−1)-th convolutional layer, to thereby generate an (m+1)-th to an (m+n)-th inception feature maps as the second group.

As one example, at the process of (I), the processor applies one or more max pooling operations, with a different size, to the input image or the input feature map received from its corresponding previous convolutional layer, to thereby generate one or more max pooling feature maps as a third group, and, at the process of (II), the processor concatenates or element-wise adds the inception feature maps of the first group, the inception feature maps of the second group and the max pooling feature maps of the third group to thereby generate the output feature map.

As one example, at the process of (I), the processor instructs the first convolutional layer to (i) apply one or more transposed convolution operations to the input image to thereby generate one or more transposed feature maps which have different sizes respectively, and (ii) apply one or more convolution operations, with a different stride and a different kernel size, to their corresponding transposed feature maps, to thereby generate one or more inception feature maps as the first group.

As one example, the processor further performs a process of: (III) obtaining a CNN output based on the output feature map from the n-th convolutional layer and then performing backpropagation of a segmentation loss obtained by referring to the CNN output and its corresponding ground truth (GT).

In accordance with still yet another aspect of the present invention, there is provided a testing device for encoding an image based on convolutional neural network (CNN), including: a communication part for acquiring at least one test image, on condition that, (i) a learning device including a first to an n-th convolutional layers has instructed each of at least one of the convolutional layers to apply one or more transposed convolution operations to an input image or an input feature map for training received from its corresponding previous convolutional layer, to thereby generate one or more transposed feature maps for training which have different sizes respectively; (ii) the learning device has applied one or more convolution operations, with a different stride and a different kernel size, to their corresponding transposed feature maps for training, to thereby generate their corresponding one or more inception feature maps for training as a first group for training; (iii) the learning device has concatenated or element-wise added the inception feature maps for training included in the first group for training to thereby generate its corresponding output feature map for training; and (iv) the learning device has obtained a CNN output for training based on the output feature map for training and then performs backpropagation by using a segmentation loss obtained by referring to the CNN output for training and its corresponding ground truth (GT); and a processor for performing processes of (I) instructing each of at least one of the convolutional layers to (i) apply the transposed convolution operations to the test image or an input feature map for testing received from its corresponding previous convolutional layer, to thereby generate one or more transposed feature maps for testing which have different sizes respectively, and (ii) apply the convolution operations, with a different stride and a different kernel size, to their corresponding transposed feature maps for testing, to thereby generate their corresponding one or more inception feature maps for testing as a first group for testing; and (II) concatenating or element-wise adding the inception feature maps for testing included in the first group for testing to thereby generate its corresponding output feature map for testing.

As one example, the inception feature maps for testing included in the first group for testing have a same size but have different characteristics.

As one example, if at least one of the convolutional layers is a k-th convolutional layer, the process of (I) includes processes of: (I-1) instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; and (I-2) (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing.

As one example, at the process of (I), the processor further applies the convolution operations to the test image or the input feature map for testing received from its corresponding previous convolutional layer to thereby generate one or more inception feature maps for testing as a second group for testing, wherein, at the process of (II), the processor concatenates or element-wise adds the inception feature maps for testing of the first group for testing and the inception feature maps for testing of the second group for testing, to thereby generate the output feature map for testing.

As one example, if at least one of the convolutional layers is a k-th convolutional layer, the process of (II) includes processes of: (II-1) instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; (II-2) (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing; and (II-3) applying an (m+1)-th to an (m+n)-th convolution filters, which have an (m+1)-th to an (m+n)-th kernel sizes, to the test image or the (k−1)-th feature map for testing received from the (k−1)-th convolutional layer, to thereby generate an (m+1)-th to an (m+n)-th inception feature maps for testing as the second group for testing.

As one example, at the process of (I), the processor further applies one or more max pooling operations, with a different size, to the test image or the input feature map for testing received from its corresponding previous convolutional layer, to thereby generate one or more max pooling feature maps for testing as a third group for testing, wherein, at the process of (II), the processor concatenates or element-wise adds the inception feature maps for testing of the first group for testing, the inception feature maps for testing of the second group for testing and the max pooling feature maps for testing of the third group for testing to thereby generate the output feature map for testing.

BRIEF DESCRIPTION OF THE DRAWINGS

The above and other objects and features of the present invention will become apparent from the following description of preferred embodiments given in conjunction with the accompanying drawings, in which:

FIG. 4 illustrates a method for encoding an image in accordance with another example embodiment of the present invention.

FIG. 5 illustrates a method for encoding an image in accordance with still another example embodiment of the present invention.

DETAILED DESCRIPTION OF THE PREFERRED EMBODIMENTS

Figure 1:
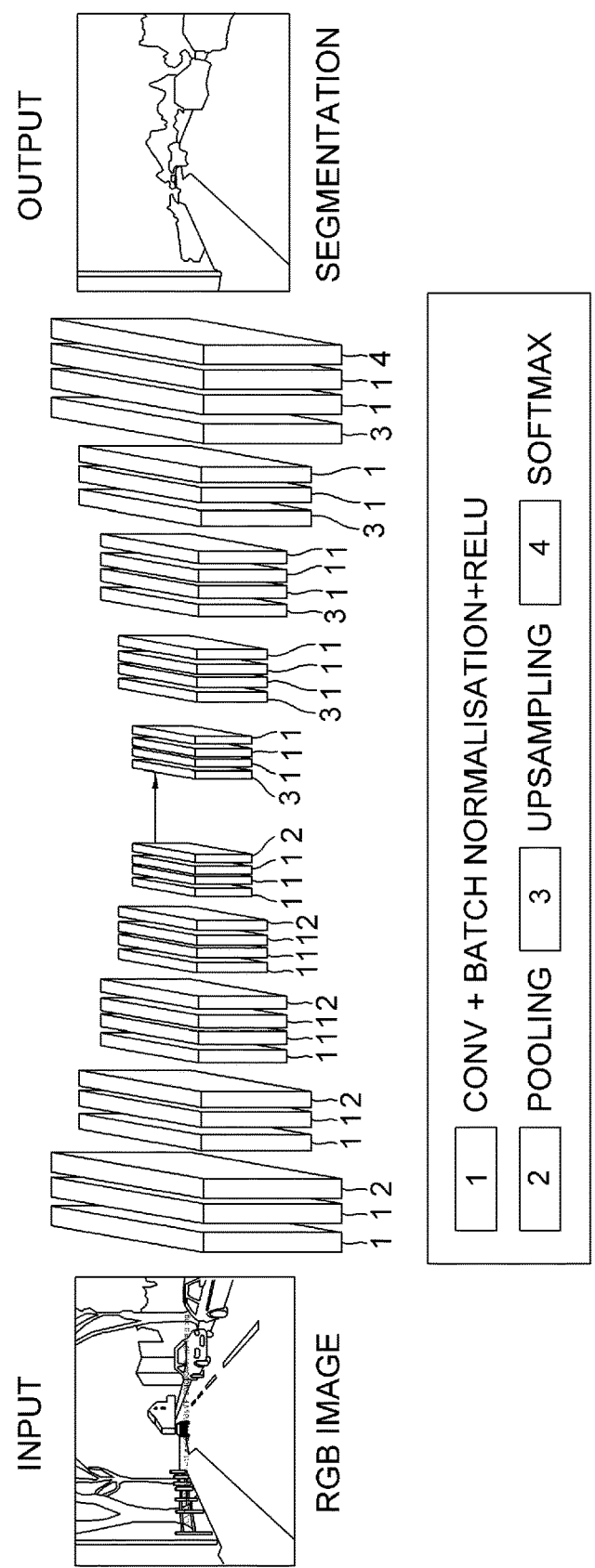
FIG. 1 is a simplified drawing of a general CNN segmentation process.
Figure 2A:
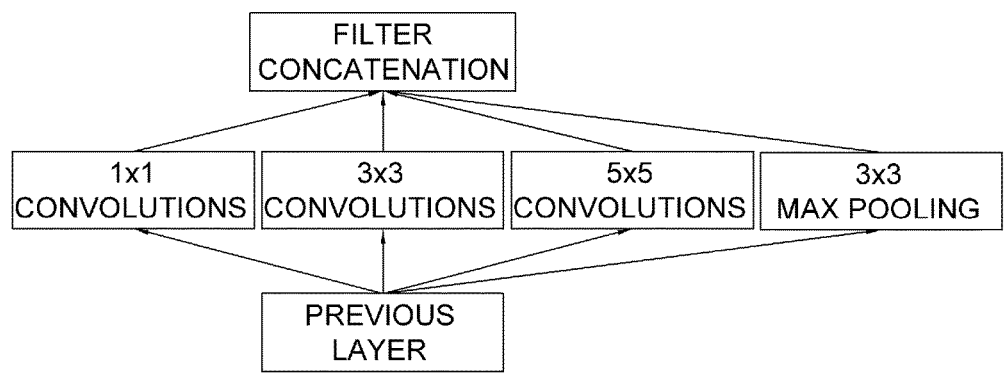
FIGS. 2A and 2B illustrate various configurations of convolutional layers for encoding images by using conventional inception methods, respectively.
Figure 2B:
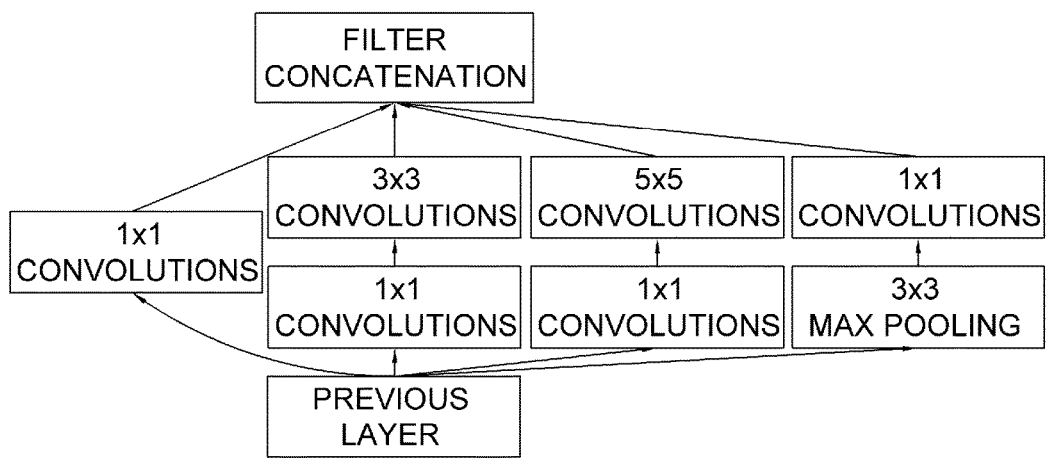

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 3:
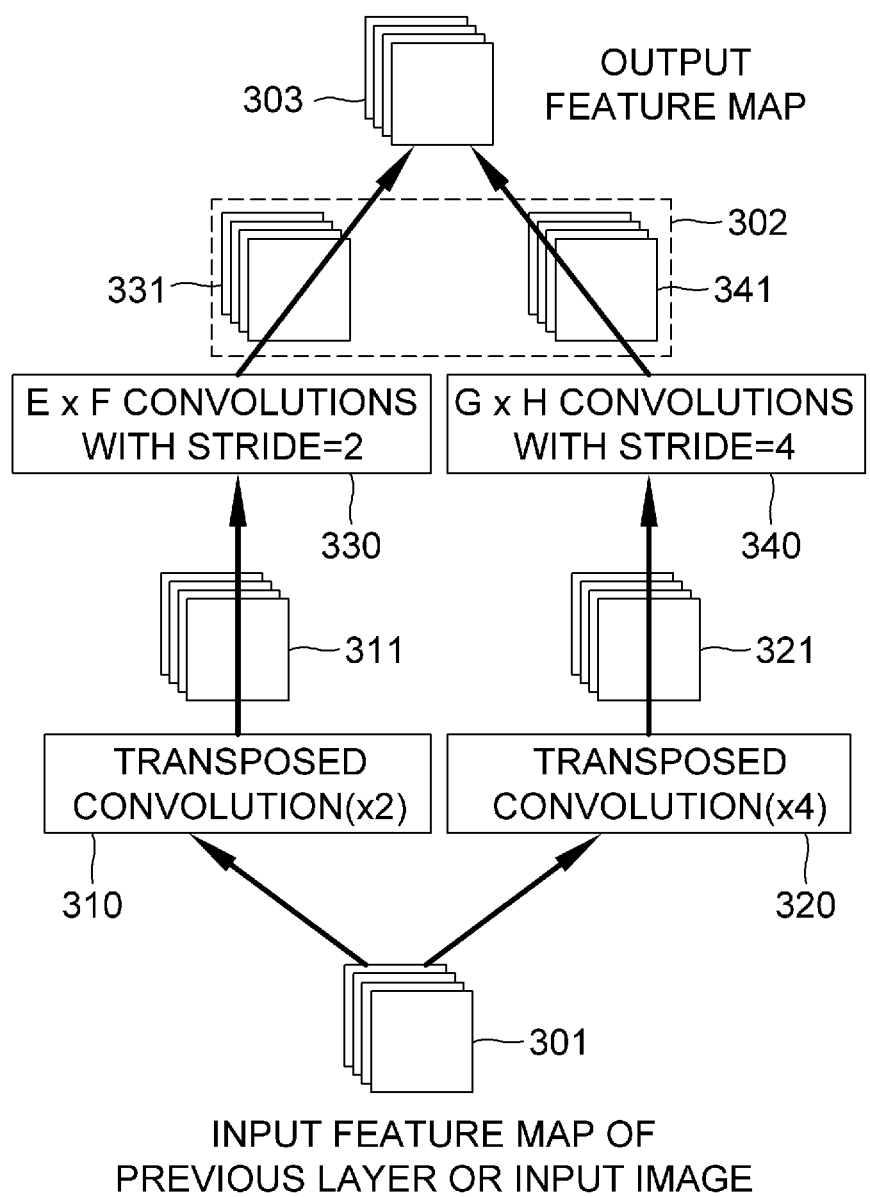
FIG. 3 illustrates a method for encoding an image in accordance with one example embodiment of the present invention.

FIG. 3 illustrates a method for encoding an image in accordance with one example embodiment of the present invention.

Each of a first to a n-th convolutional layers in a learning device or a testing device based on convolutional neural network (CNN) applies one or more convolution operations to an input image or input feature map received from its corresponding previous convolutional layer, to thereby generate a first to an n-th feature maps.

Herein, as illustrated in FIG. 3, each of at least one of the first to the n-th convolutional layers applies one or more transposed convolution operations 310 and 320 to its corresponding input feature map (or the input image) 301 received from its corresponding previous convolutional layer, to thereby generate one or more transposed feature maps which have different increased sizes respectively. Herein, the transposed convolution operations 310 and 320 may mean convolution operations for extending the size of the feature map by using the deconvolutional layer but may also include interpolation or resizing (e.g., the nearest neighbor, linear interpolation, etc.). When the transposed convolution operations 310 and 320 are applied to the input feature map (or the input image) 301, transposed feature maps 311 and 321 are generated. In the example of FIG. 3, the first transposed convolution operation 310 doubles the size of the input feature map 301 so that the size of the first transposed feature map 311 becomes the twice of the size of the input feature map 301, and the second transposed convolution operation 320 increases the size of the input feature map 301 by four times so that the size of the second transposed feature map 321 becomes the four times of the size of the input feature map 301. However, the present invention is not limited to these examples.

Thereafter, one or more convolution operations 330 and 340 are applied to their corresponding transposed feature maps 311 and 321. Specifically, the convolution operations 330 and 340, with a different stride and a different kernel size, are applied to their corresponding transposed feature maps 311 and 321, to thereby generate their corresponding one or more inception feature maps as a first group 302. For example, on the condition that a stride value of the first convolution operation 330 is 2 and a stride value of the second convolution operation 340 is 4, (i) since the size of the first transposed feature map 311 has become doubled compared to the input feature map 301, the size of the first transposed feature map 311 is made to become the same as that of the input feature map 301 by applying the first convolution operation 330 with the stride of 2, and (ii) likewise, since the size of the second transposed feature map 321 has become 4 times of that of the input feature map 301, the size of the second transposed feature map 321 is made to become the same as that of the input feature map 301 by applying the second convolution operation 340 with the stride of 4. As such, the sizes of the inception feature maps 331 and 341 within the first group 302 become the same.

Furthermore, kernel sizes to be applied to the first convolution operation 330 and the second convolution operation 340 may be determined differently such as (e×f) and (g×h) respectively. As such, various receptive fields may be considered for the input feature map 301. In particular, since various receptive fields are applied after variously changing the size of the input feature map 301, the effect of applying their corresponding kernel sizes reduced by respective specific numbers may be achieved, wherein the respective specific numbers have been multipliers by which sizes are increased through their corresponding transposed convolution operations. For example, if the kernel size of (e×f) is applied to the first transposed convolution feature map 311 having been generated by applying the first transposed convolution operation 310 to the input feature map 301 as shown in FIG. 3, the receptive field of the size of (e×f) is provided for the first transposed convolution feature map 311, but the receptive field of (e/2×f/2) can be provided for the input feature map 301.

In the example of FIG. 3, if the stride of the first convolution operation 330 is 2 and the kernel size is 3×3, it may be understood that the first inception feature map 331 in the first group 302 has been generated in consideration of the receptive field with the size of (3/2×3/2) for the input feature map 301, and if the stride of the second convolution operation 340 is 4 and the kernel size is 5×5, it may be understood that the second inception feature map 341 in the first group 302 has been generated in consideration of the receptive field with the size of (5/4×5/4) for the input feature map 301.

Herein, the inception feature maps 331 and 341 in the first group 302 have the same size but have various characteristics generated in consideration of various receptive fields.

In addition, the inception feature maps 331 and 341 in the first group 302 are concatenated or element-wise added to thereby be integrated as one output feature map 303. Further, the output feature map 303 may be an output of its corresponding convolutional layer, or a modified feature map generated from the output feature map 303 may be an output of its corresponding convolutional layer. For example, if the input feature map 301 fed into a k-th convolutional layer is a (k−1)-th feature map outputted from a (k−1)-th convolutional layer among said n convolutional layers, the operation illustrated in FIG. 3 may be performed in the k-th convolutional layer, and the output feature map 303 may be a k-th feature map outputted from the k-th convolutional layer. As another example, the modified feature map, which is generated by applying an additional convolution operation and non-linear operation such as ReLU to the output feature map 303 to change the channel and the size thereof, may be the k-th feature map outputted from the k-th convolutional layer.

Meanwhile, in the encoding method of the present invention, since the first convolutional layer does not have its previous convolutional layer, the process of obtaining the output feature map illustrated in FIG. 3 is performed by using the input image, not the input feature map. Namely, the learning device instructs the first convolutional layers to (i) apply one or more transposed convolution operations to the input image, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as the first group.

FIG. 4 illustrates a method for encoding an image in accordance with another example embodiment of the present invention.

In accordance with another example embodiment of the present invention, as illustrated in FIG. 4, inception feature maps of a second group 402 other than the first group 302 are additionally generated as compared with FIG. 3, and the inception feature maps in the first group 302 and the inception feature maps in the second group 402 are concatenated or element-wise added to thereby be integrated as the output feature map 303.

Specifically, convolution operations 410 and 420, with their corresponding kernels, are applied to the input feature map 301, to thereby generate one or more inception feature maps 411 and 421 as the second group 402.

For example, the third convolution operation 410 having a kernel size of (a×b) is applied to the input feature map 301 to thereby generate the third inception feature map 411 in the second group 402, and the fourth convolution operation 420 having a kernel size of (c×d) is applied to the input feature map 301 to thereby generate the fourth inception feature map 421 in the second group 402. The third inception feature map 411 has been generated in consideration of the receptive field with the size of (a×b) for the input feature map 301, and the fourth inception feature map 421 has been generated in consideration of the receptive field with the size of (c×d) for the input feature map 301.

Thereafter, the learning device concatenates or element-wise adds the inception feature maps 331 and 341 of the first group 302 and the inception feature maps 411 and 421 of the second group 402 to thereby integrate them as the output feature map 303.

FIG. 5 illustrates a method for encoding an image in accordance with still another example embodiment of the present invention.

In accordance with still another example embodiment of the present invention, as illustrated in FIG. 5, inception feature maps in a third group 502 are additionally generated as compared with FIG. 3 or FIG. 4. For example, the learning device concatenates or element-wise adds the inception feature maps in the third group 502 and the inception feature maps in the first group 302 or concatenates or element-wise adds the inception feature maps in the first group 302, the inception feature maps in the second group 402 and the inception feature maps in the third group 502, to thereby integrate them as the output feature map 303.

Specifically, one or more max pooling operations, with a different size, (e.g., a (3×3) max pooling illustrated in FIG. 5) are applied to the input feature map 301 to thereby generate a max pooling feature map 511 as the third group 502. The max pooling operation plays a role of generating the max pooling feature map 511 by extracting only max values from the input feature map 301 without convolution operations.

Thereafter, the learning device concatenates or element-wise adds the inception feature maps 331 and 341 in the first group 302 and the inception feature map 511 in the third group 502 or concatenates or element-wise adds the inception feature maps 331 and 341 in the first group 302, the inception feature maps 411 and 421 in the second group 402, and the inception feature maps 511 in the third group 502, to thereby integrate them as the output feature map 303.

Meanwhile, in accordance with the present invention, 1×1 convolution operations for reducing the number of channels may be sometimes used while generating the feature maps of the first group to the third group in order to reduce the amount of computations.

The learning device obtains a CNN output based on the obtained output feature map and performs backpropagation of a segmentation loss obtained by referring to the CNN output and its corresponding ground truth (GT).

Further, the methods for encoding images illustrated in FIGS. 3 to 5 may also be applied to the testing method.

Namely, on condition that (i) a learning device including a first to an n-th convolutional layers has instructed each of at least one of the convolutional layers to apply one or more transposed convolution operations to an input image or an input feature map for training received from its corresponding previous convolutional layer, to thereby generate one or more transposed feature maps for training which have different sizes respectively; (ii) the learning device has applied one or more convolution operations, with a different stride and a different kernel size, to their corresponding transposed feature maps for training, to thereby generate their corresponding one or more inception feature maps for training as a first group for training; (iii) the learning device has concatenated or element-wise added the inception feature maps for training included in the first group for training to thereby generate its corresponding output feature map for training; and (iv) the learning device has obtained a CNN output for training based on the output feature map for training and then performs backpropagation by using a segmentation loss obtained by referring to the CNN output for training and its corresponding ground truth (GT), a testing device may obtain a test image.

Then, the testing device may instruct each of at least one of the convolutional layers to (i) apply one or more transposed convolution operations to the test image or an input feature map for testing received from its corresponding previous convolutional layer, to thereby generate one or more transposed feature maps for testing which have different sizes respectively, and (ii) apply one or more convolution operations, with a different stride and a different kernel size, to their corresponding transposed feature maps for testing, to thereby generate their corresponding one or more inception feature maps for testing as a first group for testing.

Thereafter, the testing device may concatenate or element-wise add the inception feature maps for testing included in the first group for testing to thereby generate its corresponding output feature map for testing.

The present invention has an effect of increasing the sizes of feature maps by applying various sizes of transposed convolution operations to the input image or the input feature map obtained from its corresponding previous convolutional layer, and widening the kernel size from an integer range to a real number range by applying convolution operations having corresponding strides.

The present invention has another effect of obtaining feature maps having various characteristics by diversifying the receptive fields which can be considered in the input feature map obtained from its corresponding previous convolutional layer.

It would be understood by one of ordinary skill in the art that a transmission and/or a reception of the above-described images such as the training image and the test image can be performed by communication units of the learning device and the testing device, and processes of the convolutional operation, the deconvolutional operation and the loss value operation can be mainly performed by processors of the learning device and the testing device, but the present invention is not limited to these examples.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for encoding an image based on convolutional neural network (CNN), comprising steps of:
   (a) a learning device, which includes a first to an n-th convolutional layers, obtaining at least one input image;
   (b) the learning device instructing each of at least one of the convolutional layers to (i) apply at least two transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and
   (c) the learning device concatenating or element-wise adding the inception feature maps included in the first group to thereby generate its corresponding output feature map.

2. The method of claim 1, wherein the inception feature maps included in the first group have a same size but have different characteristics.

3. The method of claim 1, wherein, if at least one of the convolutional layers is a k-th convolutional layer, the step of (b) includes steps of:
   (b-1) the learning device instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; and
   (b-2) the learning device (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group.

4. The method of claim 1, wherein, at the step of (b), the learning device applies the convolution operations to the input image or the input feature map received from its corresponding previous convolutional layer to thereby generate one or more inception feature maps as a second group, and
   wherein, at the step of (c), the learning device concatenates or element-wise adds the inception feature maps of the first group and the inception feature maps of the second group to thereby generate the output feature map.

5. The method of claim 4, wherein, if at least one of the convolutional layers is a k-th convolutional layer, the step of (b) includes steps of:
   (b-1) the learning device instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2;
   (b-2) the learning device (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group; and
   (b-3) the learning device applying an (m+1)-th to an (m+n)-th convolution filters, which have an (m+1)-th to an (m+n)-th kernel sizes, to the input image or the (k−1)-th feature map received from the (k−1)-th convolutional layer, to thereby generate an (m+1)-th to an (m+n)-th inception feature maps as the second group.

6. The method of claim 4, wherein, at the step of (b), the learning device applies one or more max pooling operations, with a different size, to the input image or the input feature map received from its corresponding previous convolutional layer, to thereby generate one or more max pooling feature maps as a third group, and wherein, at the step of (c), the learning device concatenates or element-wise adds the inception feature maps of the first group, the inception feature maps of the second group and the max pooling feature maps of the third group to thereby generate the output feature map.

7. The method of claim 1, wherein, at the step of (b), the learning device instructs the first convolutional layer to (i) apply one or more transposed convolution operations to the input image to thereby generate one or more transposed feature maps which have different sizes respectively, and (ii) apply one or more convolution operations, with a different stride and a different kernel size, to their corresponding transposed feature maps, to thereby generate one or more inception feature maps as the first group.

8. The method of claim 1, further comprising a step of:
(d) the learning device obtaining a CNN output based on the output feature map from the n-th convolutional layer and then performing backpropagation of a segmentation loss obtained by referring to the CNN output and its corresponding ground truth (GT).

9. A method for encoding an image based on convolutional neural network (CNN), comprising steps of:
(a) a testing device obtaining at least one test image, on condition that (i) a learning device including a first to an n-th convolutional layers has instructed each of at least one of the convolutional layers to apply at least two transposed convolution operations to an input image or an input feature map for training received from its corresponding previous convolutional layer, to thereby generate one or more transposed feature maps for training which have different sizes respectively; (ii) the learning device has applied one or more convolution operations, with a different stride and a different kernel size, to their corresponding transposed feature maps for training, to thereby generate their corresponding one or more inception feature maps for training as a first group for training; (iii) the learning device has concatenated or element-wise added the inception feature maps for training included in the first group for training to thereby generate its corresponding output feature map for training; and (iv) the learning device has obtained a CNN output for training based on the output feature map for training and then performs backpropagation by using a segmentation loss obtained by referring to the CNN output for training and its corresponding ground truth (GT);
(b) the testing device instructing each of at least one of the convolutional layers to (i) apply the transposed convolution operations to the test image or an input feature map for testing received from its corresponding previous convolutional layer, to thereby generate one or more transposed feature maps for testing which have different sizes respectively, and (ii) apply the convolution operations, with a different stride and a different kernel size, to their corresponding transposed feature maps for testing, to thereby generate their corresponding one or more inception feature maps for testing as a first group for testing; and
(c) the testing device concatenating or element-wise adding the inception feature maps for testing included in the first group for testing to thereby generate its corresponding output feature map for testing.

10. The method of claim 9, wherein the inception feature maps for testing included in the first group for testing have a same size but have different characteristics.

11. The method of claim 9, wherein, if at least one of the convolutional layers is a k-th convolutional layer, the step of (b) includes steps of:
(b-1) the testing device instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; and
(b-2) the testing device (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing.

12. The method of claim 9, wherein, at the step of (b), the testing device further applies the convolution operations to the test image or the input feature map for testing received from its corresponding previous convolutional layer to thereby generate one or more inception feature maps for testing as a second group for testing, and
wherein, at the step of (c), the testing device concatenates or element-wise adds the inception feature maps for testing of the first group for testing and the inception feature maps for testing of the second group for testing, to thereby generate the output feature map for testing.

13. The method of claim 12, wherein, if at least one of the convolutional layers is a k-th convolutional layer, the step of (b) includes steps of:
(b-1) the testing device instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2;
(b-2) the testing device (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing; and
(b-3) the testing device applying an (m+1)-th to an (m+n)-th convolution filters, which have an (m+1)-th to an (m+n)-th kernel sizes, to the test image or the (k−1)-th feature map for testing received from the (k−1)-th convolutional layer, to thereby generate an (m+1)-th to an (m+n)-th inception feature maps for testing as the second group for testing.

14. The method of claim 12, wherein, at the step of (b), the testing device further applies one or more max pooling operations, with a different size, to the test image or the input feature map for testing received from its corresponding previous convolutional layer, to thereby generate one or more max pooling feature maps for testing as a third group for testing, and wherein, at the step of (c), the testing device concatenates or element-wise adds the inception feature maps for testing of the first group for testing, the inception feature maps for testing of the second group for testing and the max pooling feature maps for testing of the third group for testing to thereby generate the output feature map for testing.

15. A learning device for encoding an image based on convolutional neural network (CNN) which includes a first to an n-th convolutional layers, comprising:

a communication part for obtaining at least one training image as an input image; and a processor for performing processes of (I) instructing each of at least one of the convolutional layers to (i) apply at least two transposed convolution operations to the input image or an input feature map received from its corresponding previous convolutional layer, to thereby generate one or more transposed feature maps which have different sizes respectively, and (ii) apply one or more convolution operations, with a different stride and a different kernel size, to their corresponding transposed feature maps, to thereby generate their corresponding one or more inception feature maps as a first group; and (II) concatenating or element-wise adding the inception feature maps included in the first group to thereby generate its corresponding output feature map.

16. The learning device of claim 15, wherein the inception feature maps included in the first group have a same size but have different characteristics.

17. The learning device of claim 15, wherein, if at least one of the convolutional layers is a k-th convolutional layer, the process of (I) includes processes of: (I-1) instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2; and (I-2) (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group.

18. The learning device of claim 15, wherein, at the process of (I), the processor applies the convolution operations to the input image or the input feature map received from its corresponding previous convolutional layer to thereby generate one or more inception feature maps as a second group, and wherein, at the process of (II), the processor concatenates or element-wise adds the inception feature maps of the first group and the inception feature maps of the second group to thereby generate the output feature map.

19. The learning device of claim 18, wherein, if at least one of the convolutional layers is a k-th convolutional layer, the process of (I) includes processes of:

(I-1) instructing the k-th convolutional layer to apply a first to an m-th transposed convolution operations to the input image or a (k−1)-th feature map received from a (k−1)-th convolutional layer, to thereby generate a first to an m-th transposed feature maps which have a first to an m-th sizes, wherein m is a natural number equal to or greater than 2;

(I-2) (i) determining a first to an m-th stride sizes by referring to each ratio between a size of the (k−1)-th feature map and each of the first to the m-th transposed feature maps and (ii) applying a first to an m-th convolution filters having the first to the m-th stride sizes and a first to an m-th kernel sizes, respectively, to the first to the m-th transposed feature maps, to thereby generate a first to an m-th inception feature maps as the first group; and (I-3) applying an (m+1)-th to an (m+n)-th convolution filters, which have an (m+1)-th to an (m+n)-th kernel sizes, to the input image or the (k−1)-th feature map received from the (k−1)-th convolutional layer, to thereby generate an (m+1)-th to an (m+n)-th inception feature maps as the second group.

20. The learning device of claim 18, wherein, at the process of (I), the processor applies one or more max pooling operations, with a different size, to the input image or the input feature map received from its corresponding previous convolutional layer, to thereby generate one or more max pooling feature maps as a third group, and wherein, at the process of (II), the processor concatenates or element-wise adds the inception feature maps of the first group, the inception feature maps of the second group and the max pooling feature maps of the third group to thereby generate the output feature map.

21. The learning device of claim 15, wherein, at the process of (I), the processor instructs the first convolutional layer to (i) apply one or more transposed convolution operations to the input image to thereby generate one or more transposed feature maps which have different sizes respectively, and (ii) apply one or more convolution operations, with a different stride and a different kernel size, to their corresponding transposed feature maps, to thereby generate one or more inception feature maps as the first group.

22. The learning device of claim 15, wherein the processor further performs a process of:

(III) obtaining a CNN output based on the output feature map from the n-th convolutional layer and then performing backpropagation of a segmentation loss obtained by referring to the CNN output and its corresponding ground truth (GT).

23. A testing device for encoding an image based on convolutional neural network (CNN), comprising:

a communication part for acquiring at least one test image, on condition that, (i) a learning device including a first to an n-th convolutional layers has instructed each of at least one of the convolutional layers to apply at least two transposed convolution operations to an input image or an input feature map for training received from its corresponding previous convolutional layer, to thereby generate one or more transposed feature maps for training which have different sizes respectively; (ii) the learning device has applied one or more convolution operations, with a different stride and a different kernel size, to their corresponding transposed feature maps for training, to thereby generate their corresponding one or more inception feature maps for training as a first group for training; (iii) the learning device has concatenated or element-wise added the inception feature maps for training included in the first group for training to thereby generate its corresponding output feature map for training; and (iv) the learning device has obtained a CNN output for training based on the output feature map for training and then performs backpropagation by using a segmentation loss obtained by referring to the CNN output for training and its corresponding ground truth (GT); and a processor for performing processes of (I) instructing each of at least one of the convolutional layers to (i) apply the transposed convolution operations to the test image or an input feature map for testing received from its corresponding previous convolutional layer, to thereby generate one or more transposed feature maps for testing which have different sizes respectively, and (ii) apply the convolution operations, with a different stride and a different kernel size, to their corresponding transposed feature maps for testing, to thereby generate their corresponding one or more inception feature maps for testing as a first group for testing; and (II) concatenating or element-wise adding the inception feature maps for testing included in the first group for testing to thereby generate its corresponding output feature map for testing.

24. The testing device of claim 23, wherein the inception feature maps for testing included in the first group for testing have a same size but have different characteristics.

25. The testing device of claim 23, wherein, if at least one of the convolutional layers is a k-th convolutional layer, the process of (I) includes processes of:

(I-1) instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2; and (I-2) (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing.

26. The testing device of claim 23, wherein, at the process of (I), the processor further applies the convolution operations to the test image or the input feature map for testing received from its corresponding previous convolutional layer to thereby generate one or more inception feature maps for testing as a second group for testing, and wherein, at the process of (II), the processor concatenates or element-wise adds the inception feature maps for testing of the first group for testing and the inception feature maps for testing of the second group for testing, to thereby generate the output feature map for testing.

27. The testing device of claim 26, wherein, if at least one of the convolutional layers is a k-th convolutional layer, the process of (II) includes processes of:

(II-1) instructing the k-th convolutional layer to apply a first to an m-th transposed convolution operations to the test image or a (k−1)-th feature map for testing received from a (k−1)-th convolutional layer, to thereby generate a first to an m-th transposed feature maps for testing which have a first to an m-th sizes, wherein m is a natural number equal to or greater than 2;

(II-2) (i) determining a first to an m-th stride sizes by referring to each ratio between a size of the (k−1)-th feature map for testing and each of the first to the m-th transposed feature maps for testing and (ii) applying a first to an m-th convolution filters having the first to the m-th stride sizes and a first to an m-th kernel sizes, respectively, to the first to the m-th transposed feature maps for testing, to thereby generate a first to an m-th inception feature maps for testing as the first group for testing; and (II-3) applying an (m+1)-th to an (m+n)-th convolution filters, which have an (m+1)-th to an (m+n)-th kernel sizes, to the test image or the (k−1)-th feature map for testing received from the (k−1)-th convolutional layer, to thereby generate an (m+1)-th to an (m+n)-th inception feature maps for testing as the second group for testing.

28. The testing device of claim 26, wherein, at the process of (I), the processor further applies one or more max pooling operations, with a different size, to the test image or the input feature map for testing received from its corresponding previous convolutional layer, to thereby generate one or more max pooling feature maps for testing as a third group for testing, and wherein, at the process of (II), the processor concatenates or element-wise adds the inception feature maps for testing of the first group for testing, the inception feature maps for testing of the second group for testing and the max pooling feature maps for testing of the third group for testing to thereby generate the output feature map for testing.

* * * * *